(12) United States Patent
Agarwal et al.

(10) Patent No.: US 12,244,628 B2
(45) Date of Patent: Mar. 4, 2025

(54) INTELLIGENT AND PROACTIVE DEVICE VULNERABILITY DETECTION AND PROTECTION

(71) Applicant: Plume Design, Inc., Palo Alto, CA (US)

(72) Inventors: Preeti Agarwal, Cupertino, CA (US); William J. McFarland, Portola Valley, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 269 days.

(21) Appl. No.: 17/752,252

(22) Filed: May 24, 2022

(65) Prior Publication Data

US 2023/0388329 A1 Nov. 30, 2023

(51) Int. Cl.
*H04L 9/40* (2022.01)
*G06N 5/04* (2023.01)

(52) U.S. Cl.
CPC ........... *H04L 63/1433* (2013.01); *G06N 5/04* (2013.01)

(58) Field of Classification Search
CPC ....... H04L 63/1433; G06N 5/04; G06N 20/00
See application file for complete search history.

(56) References Cited

U.S. PATENT DOCUMENTS

| | | | |
|---|---|---|---|
| 2017/0093910 A1 | 3/2017 | Gukal et al. | |
| 2020/0389480 A1* | 12/2020 | Nunes | H04L 67/02 |
| 2023/0208870 A1* | 6/2023 | Yellapragada | G06F 21/53 |
| | | | 726/22 |
| 2023/0281281 A1* | 9/2023 | Sankaranarayanan | ........................ |
| | | | G06N 20/00 |
| | | | 726/2 |
| 2023/0291759 A1* | 9/2023 | Siraj | H04L 63/1433 |

OTHER PUBLICATIONS

International Search Report and Written Opinion to corresponding International Application No. PCT/US23/66992 mailed Sep. 26, 2023 (9 pages).

* cited by examiner

*Primary Examiner* — Baotran N To
(74) *Attorney, Agent, or Firm* — Nicholas Martin; Greenberg Traurig, LLP (57) ABSTRACT

System and methods are provided for building intelligence around IoT devices that can prioritize an attack attack sphere, such that scanning and protection can be focused on risky spheres before others that may be less at risk. The attack spheres include specific device types, vendors, geographic locations, demographics, or organizations. Priority based vulnerability scanning and protection is utilized along with the concept of attack spheres to define priority zones which may be unique. Priority computation based on trend analysis and predictive analysis is used to determine the vulnerability of specific devices and groups of devices. This will significantly reduce the attack exposure and ensures the proactive damage control.

20 Claims, 5 Drawing Sheets

INTELLIGENT AND PROACTIVE DEVICE VULNERABILITY DETECTION AND PROTECTION

FIELD OF THE DISCLOSURE

The present disclosure generally relates to networking systems and methods. more particularly, the present disclosure relates to intelligent and proactive device vulnerability detection and protection.

BACKGROUND OF THE DISCLOSURE

As the use of IoT devices becomes more and more common, it is becoming increasingly more difficult to protect these devices from attacks. IoT devices most commonly used by consumers lack built-in security, as most of them are not designed with security first in mind. Additionally, common IoT devices include software which can have several vulnerabilities that become the primary and easy attack vector for attackers to compromise the devices and use them as bots to launch additional, more sophisticated, attacks. Users are mostly unaware of these software vulnerabilities and lack the technical knowledge and ability to fix these vulnerabilities. Attackers tend to target and focus the attacks on specific device types which can result in inconsistent protection of multiple devices. These attacks could be specific to any device type, vendor, geographic location, demographic, or organization.

Most existing solutions perform scans of individual devices based on a schedule or other types of manual triggers. All the devices and locations are treated equally without any intelligent prioritization and determination of where the scanning and protection should be prioritized. As a result, it is possible that the protection algorithm would conduct delayed scanning (based on weekly schedule) of the locations, homes, offices, and others that are more vulnerable to attack then others. This leaves the vulnerability undetected and increases the attack potential and damage potential from an attack.

BRIEF SUMMARY OF THE DISCLOSURE

The present disclosure relates to intelligent and proactive device vulnerability detection and protection. System and methods are provided for building intelligence around IoT devices that can prioritize an attack attack sphere, such that scanning and protection can be focused on risky spheres before others that may be less at risk. The attack spheres include specific device types, vendors, geographic locations, demographics, or organizations. Priority based vulnerability scanning and protection is utilized along with the concept of attack spheres to define priority zones which may be unique. Priority computation based on trend analysis and predictive analysis is used to determine the vulnerability of specific devices and groups of devices. This will significantly reduce the attack exposure and ensures the proactive damage control.

In various embodiments, the present disclosure includes a method of steps, an apparatus configured to implement the steps, and a non-transitory computer-readable storage medium having computer readable code stored thereon for programming a computer to perform the steps. The steps include: determining attack threats for devices based on trend analysis and predictive analysis; assigning priority to attack spheres responsive to determining the threat to devices within the attack sphere; scanning devices based on the assigned priority, wherein devices in an identified priority attack sphere are one or more of scanned before other devices, scanned more frequently, and scanned at an increased level; applying additional security policies to devices in an identified priority attack sphere; and informing a user or service provider of the scanning operations and outcomes. The attack spheres are the impact scope of an attack in terms of time and space defining any of device types, device vendors, device models, software status, commonly used libraries, geographic location, demographic, organization, and time to identify risky spheres to focus protection. The predictive analysis is based on historic data to forecast the attack spheres that are more likely potential attack targets than others. The predictive analysis utilizes a prediction algorithm based on Machine Learning (ML). The steps may further include utilizing a combination of current trend and prediction analysis to catch any emerging trend early in time. All devices concerning a user with attack spheres may be scanned with priority in order to protect the devices against lateral attacks. The additional security policies may include any of blocking traffic, quarantining devices, and advising a user to take a device offline or upgrade software for a device.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a mobile device, which may be used for the user device in the distributed Wi-Fi system of FIG. 1 or the like;

DETAILED DESCRIPTION OF THE DISCLOSURE

Again, the present disclosure relates to systems and methods for building intelligence around IoT devices that can prioritize an attack attack sphere, such that scanning and protection can be focused on risky spheres before others that may be less at risk. The attack spheres include specific device types, vendors, geographic locations, demographics, or organizations. Priority based vulnerability scanning and protection is utilized along with the concept of attack spheres to define priority zones which may be unique. Priority computation based on trend analysis and predictive analysis is used to determine the vulnerability of specific devices and groups of devices. This will significantly reduce the attack exposure and ensures the proactive damage control.

Distributed Wi-Fi System

Figure 1:
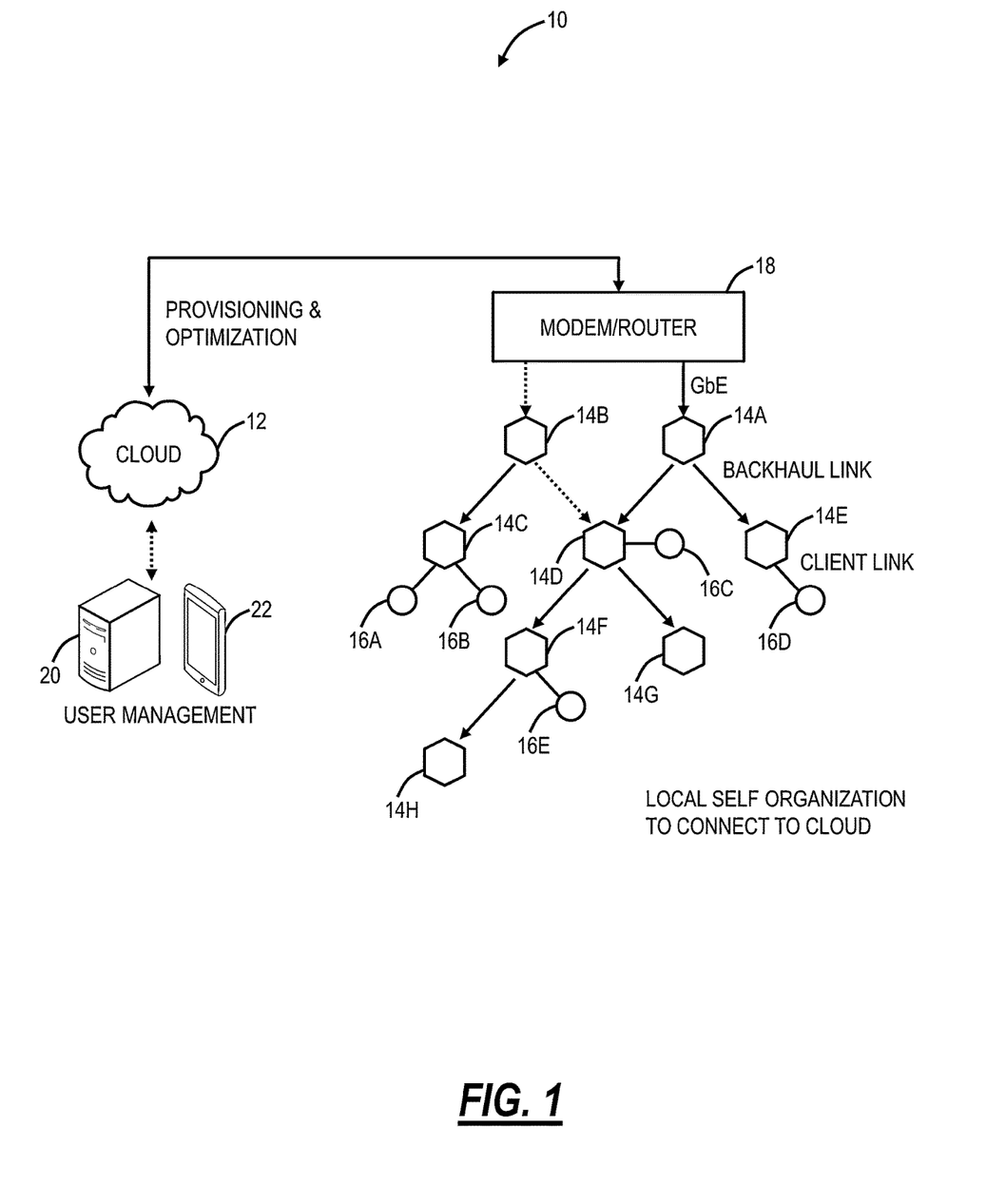
FIG. 1 is a network diagram of a distributed Wi-Fi system with cloud-based control and management.

FIG. 1 is a network diagram of a distributed Wi-Fi system 10 with control via a cloud 12 service. The distributed Wi-Fi system 10 can operate in accordance with the IEEE 802.11 protocols and variations thereof. The distributed Wi-Fi system 10 includes a plurality of access points 14 (labeled as access points 14A-14H), which can be distributed throughout a location, such as a residence, office, or the like. That is, the distributed Wi-Fi system 10 contemplates operation in any physical location where it is inefficient or impractical to service with a single access point, repeaters, or a mesh system. As described herein, the distributed Wi-Fi system 10 can be referred to as a network, a system, a Wi-Fi network, a Wi-Fi system, a cloud-based system, etc. The access points 14 can be referred to as nodes, access points, Wi-Fi nodes, Wi-Fi access points, etc. The objective of the access points 14 is to provide network connectivity to Wi-Fi client devices 16 (labeled as Wi-Fi client devices 16A-16E). The Wi-Fi client devices 16 can be referred to as client devices, user devices, clients, Wi-Fi clients, Wi-Fi devices, etc.

In a typical residential deployment, the distributed Wi-Fi system 10 can include between 3 to 12 access points or more in a home. A large number of access points 14 (which can also be referred to as nodes in the distributed Wi-Fi system 10) ensures that the distance between any access point 14 is always small, as is the distance to any Wi-Fi client device 16 needing Wi-Fi service. That is, an objective of the distributed Wi-Fi system 10 can be for distances between the access points 14 to be of similar size as distances between the Wi-Fi client devices 16 and the associated access point 14. Such small distances ensure that every corner of a consumer's home is well covered by Wi-Fi signals. It also ensures that any given hop in the distributed Wi-Fi system 10 is short and goes through few walls. This results in very strong signal strengths for each hop in the distributed Wi-Fi system 10, allowing the use of high data rates, and providing robust operation. Note, those skilled in the art will recognize the Wi-Fi client devices 16 can be mobile devices, tablets, computers, consumer electronics, home entertainment devices, televisions, IoT devices, or any network-enabled device. For external network connectivity, one or more of the access points 14 can be connected to a modem/router 18, which can be a cable modem, Digital Subscriber Loop (DSL) modem, or any device providing external network connectivity to the physical location associated with the distributed Wi-Fi system 10.

While providing excellent coverage, a large number of access points 14 (nodes) presents a coordination problem. Getting all the access points 14 configured correctly and communicating efficiently requires centralized control. This cloud 12 service can provide control via servers 20 that can be reached across the Internet and accessed remotely, such as through an application ("app") running on a user device 22. The running of the distributed Wi-Fi system 10, therefore, becomes what is commonly known as a "cloud service." The servers 20 are configured to receive measurement data, to analyze the measurement data, and to configure the access points 14 in the distributed Wi-Fi system 10 based thereon, through the cloud 12. The servers 20 can also be configured to determine which access point 14 each of the Wi-Fi client devices 16 connect (associate) with. That is, in an example aspect, the distributed Wi-Fi system 10 includes cloud-based control (with a cloud-based controller or cloud service in the cloud) to optimize, configure, and monitor the operation of the access points 14 and the Wi-Fi client devices 16. This cloud-based control is contrasted with a conventional operation that relies on a local configuration, such as by logging in locally to an access point. In the distributed Wi-Fi system 10, the control and optimization does not require local login to the access point 14, but rather the user device 22 (or a local Wi-Fi client device 16) communicating with the servers 20 in the cloud 12, such as via a disparate network (a different network than the distributed Wi-Fi system 10) (e.g., LTE, another Wi-Fi network, etc.).

The access points 14 can include both wireless links and wired links for connectivity. In the example of FIG. 1, the access point 14A has an example gigabit Ethernet (GbE) wired connection to the modem/router 18. Optionally, the access point 14B also has a wired connection to the modem/router 18, such as for redundancy or load balancing. Also, the access points 14A, 14B can have a wireless connection to the modem/router 18. The access points 14 can have wireless links for client connectivity (referred to as a client link) and for backhaul (referred to as a backhaul link). The distributed Wi-Fi system 10 differs from a conventional Wi-Fi mesh network in that the client links and the backhaul links do not necessarily share the same Wi-Fi channel, thereby reducing interference. That is, the access points 14 can support at least two Wi-Fi wireless channels—which can be used flexibly to serve either the client link or the backhaul link and may have at least one wired port for connectivity to the modem/router 18, or for connection to other devices. In the distributed Wi-Fi system 10, only a small subset of the access points 14 require direct connectivity to the modem/router 18 with the non-connected access points 14 communicating with the modem/router 18 through the backhaul links back to the connected access points 14.

Distributed Wi-Fi System Compared to Conventional Wi-Fi Systems

Figure 2:
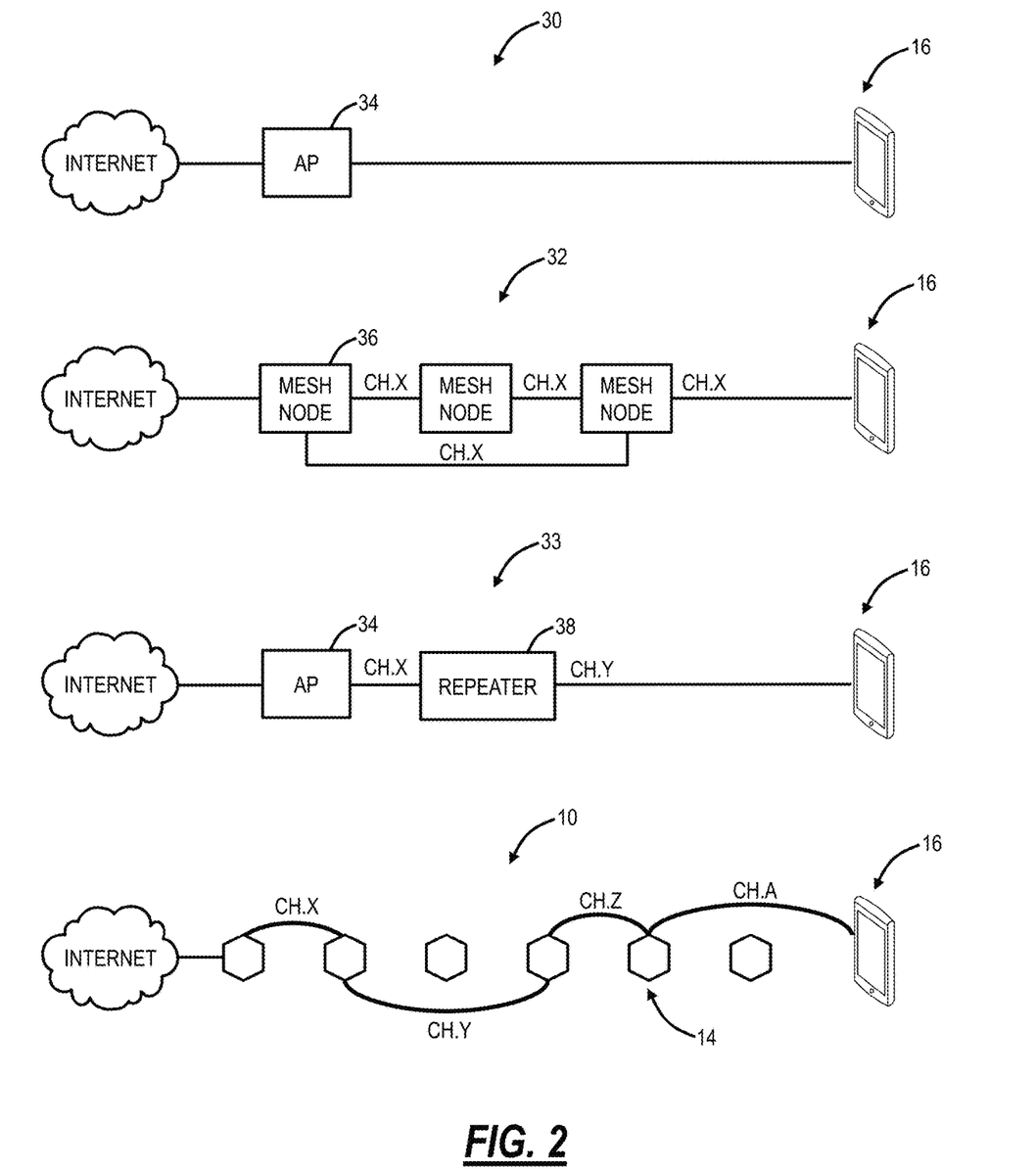
FIG. 2 is a network diagram of differences in the operation of the distributed Wi-Fi system of FIG. 1 relative to a conventional single access point system, a Wi-Fi mesh network, and a Wi-Fi repeater network.

FIG. 2 is a network diagram of differences in the operation of the distributed Wi-Fi system 10 relative to a conventional single access point system 30, a Wi-Fi mesh network 32, and a Wi-Fi repeater network 33. The single access point system 30 relies on a single, high-powered access point 34, which may be centrally located to serve all Wi-Fi client devices 16 in a location (e.g., house). Again, as described herein, in a typical residence, the single access point system 30 can have several walls, floors, etc. between the access point 34 and the Wi-Fi client devices 16. Plus, the single access point system 30 operates on a single channel, leading to potential interference from neighboring systems. The Wi-Fi mesh network 32 solves some of the issues with the single access point system 30 by having multiple mesh nodes 36, which distribute the Wi-Fi coverage. Specifically, the Wi-Fi mesh network 32 operates based on the mesh nodes 36 being fully interconnected with one another, sharing a channel such as a channel X between each of the mesh nodes 36 and the Wi-Fi client device 16. That is, the Wi-Fi mesh network 32 is a fully interconnected grid, sharing the same channel, and allowing multiple different paths between the mesh nodes 36 and the Wi-Fi client device 16. However, since the Wi-Fi mesh network 32 uses the same backhaul channel, every hop between source points divides the network capacity by the number of hops taken to deliver the data. For example, if it takes three hops to stream a video to a Wi-Fi client device 16, the Wi-Fi mesh network 32 is left with only ⅓ the capacity. The Wi-Fi repeater network 33 includes the access point 34 coupled wirelessly to a Wi-Fi repeater 38. The Wi-Fi repeater network 33 is a star topology where there is at most one Wi-Fi repeater 38 between the access point 14 and the Wi-Fi client device 16. From a channel perspective, the access point 34 can communicate to the Wi-Fi repeater 38 on a first channel, Ch. X, and the Wi-Fi repeater 38 can communicate to the Wi-Fi client device 16 on a second channel, Ch. Y.

The distributed Wi-Fi system 10 solves the problem with the Wi-Fi mesh network 32 of requiring the same channel for all connections by using a different channel or band for the various hops (note, some hops may use the same channel/band, but it is not required), to prevent slowing down the Wi-Fi speed. For example, the distributed Wi-Fi system 10 can use different channels/bands between access points 14 and between the Wi-Fi client device 16 (e.g., Chs. X, Y, Z, A), and also, the distributed Wi-Fi system 10 does not necessarily use every access point 14, based on configuration and optimization by the cloud 12. The distributed Wi-Fi system 10 solves the problems of the single access point system 30 by providing multiple access points 14. The distributed Wi-Fi system 10 is not constrained to a star topology as in the Wi-Fi repeater network 33, which at most allows two wireless hops between the Wi-Fi client device 16 and a gateway. Also, the distributed Wi-Fi system 10 forms a tree topology where there is one path between the Wi-Fi client device 16 and the gateway, but which allows for multiple wireless hops, unlike the Wi-Fi repeater network 33.

Wi-Fi is a shared, simplex protocol meaning only one conversation between two devices can occur in the network at any given time, and if one device is talking the others need to be listening. By using different Wi-Fi channels, multiple simultaneous conversations can happen simultaneously in the distributed Wi-Fi system 10. By selecting different Wi-Fi channels between the access points 14, interference and congestion are avoided. The server 20 through the cloud 12 automatically configures the access points 14 in an optimized channel hop solution. The distributed Wi-Fi system 10 can choose routes and channels to support the ever-changing needs of consumers and their Wi-Fi client devices 16. The distributed Wi-Fi system 10 approach is to ensure Wi-Fi signals do not need to travel far—either for backhaul or client connectivity. Accordingly, the Wi-Fi signals remain strong and avoid interference by communicating on the same channel as in the Wi-Fi mesh network 32 or with Wi-Fi repeaters. In an example aspect, the servers 20 in the cloud 12 are configured to optimize channel selection for the best user experience.

Of note, the present disclosure for intelligent monitoring is not limited to the distributed Wi-Fi system 10 but contemplates any of the Wi-Fi networks 10, 30, 32, 33, with monitoring through the cloud 12. For example, different vendors can make access points 14, 34, mesh nodes 36, repeaters 38, etc. However, it is possible for unified control via the cloud using standardized techniques for communication with the cloud 12. One such example includes OpenSync, sponsored by the Applicant of the present disclosure and described at www.opensync.io/documentation. OpenSync is cloud-agnostic open-source software for the delivery, curation, and management of services for the modern home. That is, this provides standardization of the communication between devices and the cloud 12. OpenSync acts as silicon, Customer Premises Equipment (CPE), and cloud-agnostic connection between the in-home hardware devices and the cloud 12. This is used to collect measurements and statistics from the connected Wi-Fi client devices 16 and network management elements, and to enable customized connectivity services.

Cloud-Based Wi-Fi Management

Conventional Wi-Fi systems utilize local management, such as where a user on the Wi-Fi network connects to a designated address (e.g., 192.168.1.1, etc.). The distributed Wi-Fi system 10 is configured for cloud-based management via the servers 20 in the cloud 12. Also, the single access point system 30, the Wi-Fi mesh network 32, and the Wi-Fi repeater network 33 can support cloud-based management as described above. For example, the APs 34 and/or the mesh nodes 36 can be configured to communicate with the servers 20 in the cloud 12. This configuration can be through a software agent installed in each device or the like, e.g., OpenSync. As described herein, cloud-based management includes reporting of Wi-Fi related performance metrics to the cloud 12 as well as receiving Wi-Fi-related configuration parameters from the cloud 12. The systems and methods contemplate use with any Wi-Fi system (i.e., the distributed Wi-Fi system 10, the single access point system 30, the Wi-Fi mesh network 32, and the Wi-Fi repeater network 33, etc.), including systems that only support reporting of Wi-Fi related performance metrics (and not supporting cloud-based configuration).

The cloud 12 utilizes cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase SaaS is sometimes used to describe application programs offered through cloud computing. A common shorthand for a provided cloud computing service (or even an aggregation of all existing cloud services) is "the cloud."

Example Server Architecture

Figure 3:
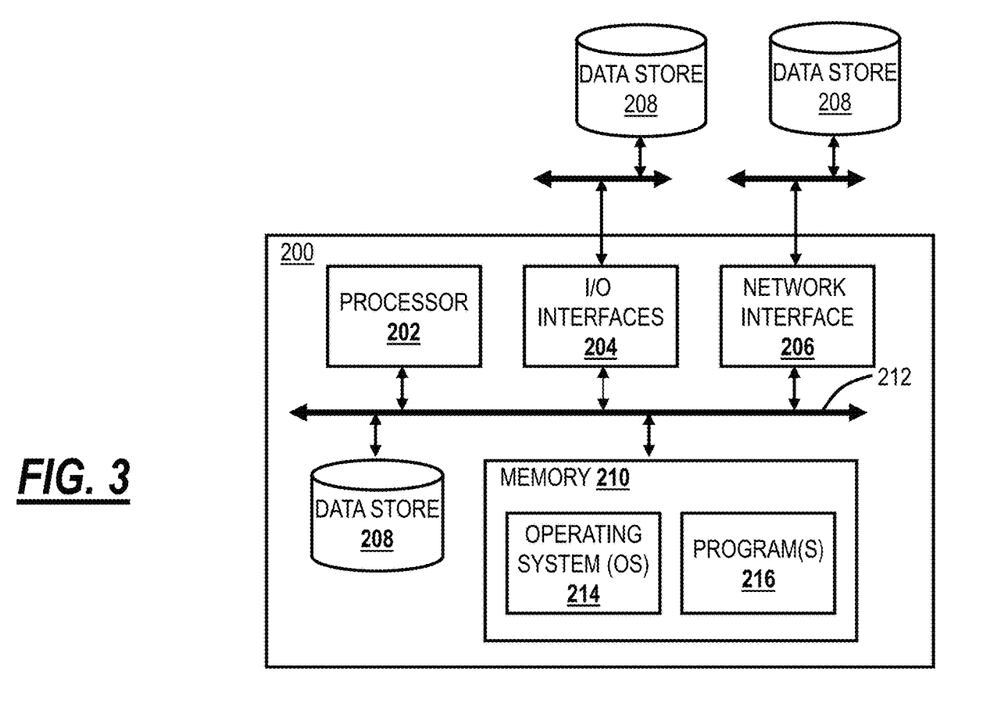
FIG. 3 is a block diagram of a server which may be used in the cloud, in other systems, or standalone.

FIG. 3 is a block diagram of a server 200 which may be used in the cloud 12, in other systems, or standalone. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. The user input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet. The network interface 206 may include, for example, an Ethernet card or adapter (e.g., 10BaseT, Fast Ethernet, Gigabit Ethernet, 10 GbE) or a wireless local area network (W LAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 4:
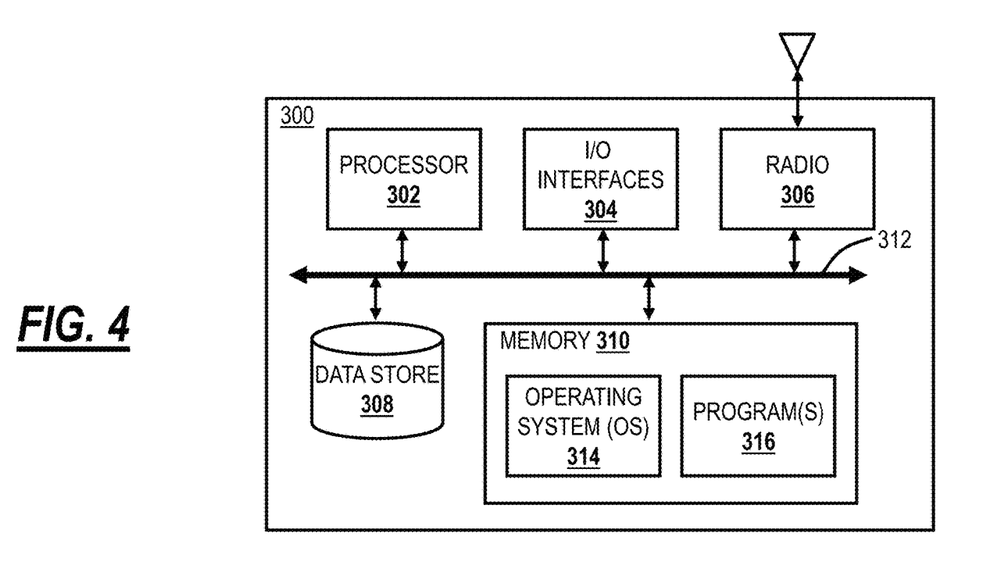

FIG. 4 is a block diagram of a user device 300, which may be used for the user device 22 or the like. The user device 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the user device 300. Additionally, the I/O interfaces 304 may further include an imaging device, i.e., camera, video camera, etc.

The radio 306 enables wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g., 3G/4G/5G, etc.); wireless home network communication protocols; proprietary wireless data communication protocols such as variants of Wireless USB; and any other protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system (O/S) 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. In a typical example, the end user typically uses one or more of the programs 316 along with a network.

Attack Sphere

The present disclosure is focused on building an intelligent system that can prioritize attack attack spheres, such that scanning and protection can be focused on risky spheres before others. This will significantly reduce the attack exposure and ensures the proactive damage control.

An attack sphere is described as the impact scope of the attack in terms of time and space. The attack sphere can be based on a plurality of characteristics which include:
  Device types—a specific device type is impacted.
  Device vendors—one, more or all devices of a vendor are impacted.
  Device models—a specific model of a device type is impacted.
  Software version status:
    Recent software updates—a recent software update is impacted.
    No software update when one is required, which could be determined by date of last SW update, or determined by looking at what version of SW is available for the given device on the web and comparing those versions to the one currently on the device.
  Commonly used libraries— A commonly used library is impacted. A vulnerability is published in a commonly used library or component in IoT (e.g.: TCP stack, miniupnpd). All devices using the library are impacted.
  The distribution of the attacks is mostly focused on a geographic location, specific demographic, or organization.
  Time—Specific month of the year when the attack activity is high. Eg: political unrest, festive season, tax filing months etc.

An attack sphere can have a cascading effect on other spheres. In particular, some spheres or groups of devices may be shown to frequently transfer attacks laterally to other devices in the home. These spheres will be correlated to eventually identify the users that are most impacted or potential targets.

It will be appreciated that various embodiments of the present disclosure are adapted for building intelligence around IoT devices that can prioritize an attack attack sphere, although the present disclosure may be adapted to be used for any type of device and all such embodiments are contemplated herein.

Vulnerability Detection and Protection Method

The present disclosure provides the following method for vulnerability detection and protection of IoT devices. The method includes a current trend analysis system and an attack prediction system.

The current trend analysis system includes an on-going trend analysis based on the current vulnerability and attacks exploiting that vulnerability. Intelligent correlation of the vulnerabilities is based on factors such as corresponding attack history. This includes which sphere was most impacted by the vulnerability. Using well known clustering techniques, the present method can classify the vulnerability and attack data to build knowledge about the ongoing vulnerability and attack trends. These trends include general trends per attack sphere and specific vulnerability trends per attack sphere which include where the vulnerabilities are present and where the vulnerabilities are being compromised.

In addition to corresponding attack history, additional factors include ongoing attacks and correlation based on the trends.

The attack prediction system provides a predictive analysis system based on the historic data forecasting the spheres that are more likely and potential attack targets than others. The prediction system will forecast where future potential attacks might take place. This system takes advantage of attack history by building back-end analytics to identify which devices are highly prone to attacks. Additionally, a prediction algorithm is based on Machine Learning (ML) to predict which spheres are going to be potential targets of an attack.

The present system utilizes the combination of current trends in addition to the predictions to catch any emerging trend early before an attack might take place. For example, if an attack sphere is high-risk as per the prediction. Attack activities initiate in these spheres; However, the trend may still not be clear. In such cases, a predictive analysis will be leveraged to prioritize protection for these spheres.

Figure 5:
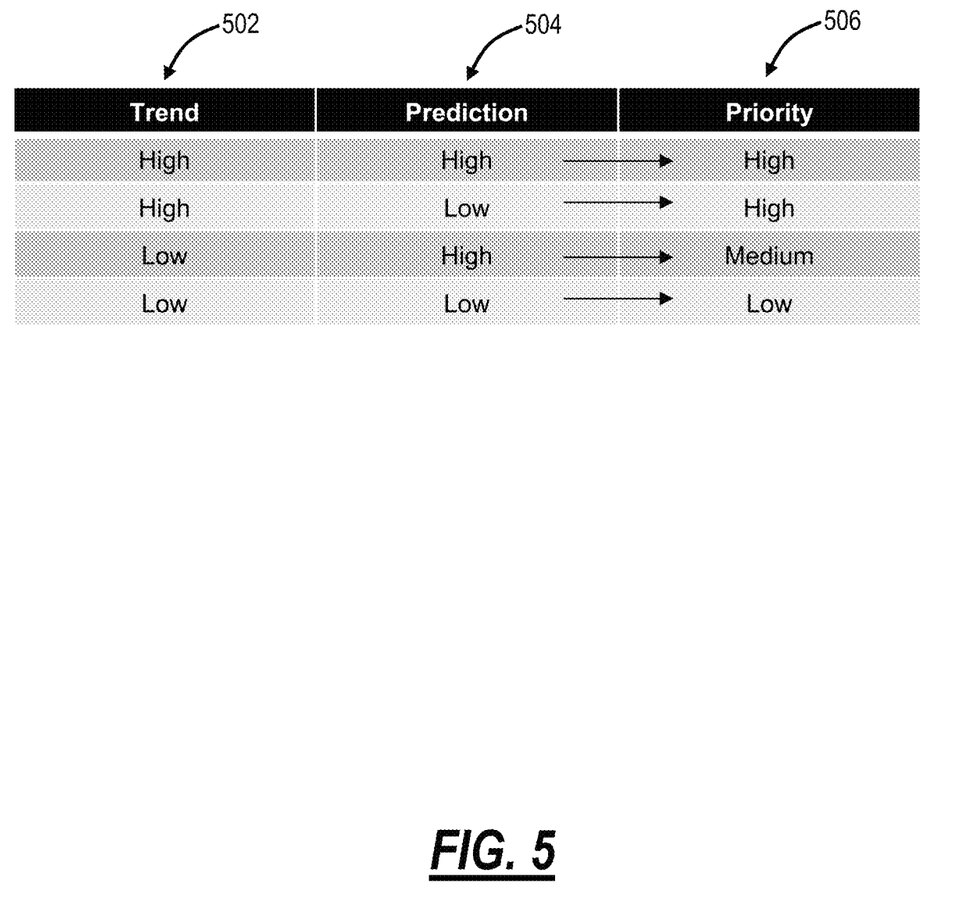
FIG. 5 is a table showing different results based on trend 502, prediction 504, and the priority 506 given to a sphere based on the resulting trend 502 and prediction 504 findings.

The priority computation allows the system to prioritize spheres which may be identified as high-risk. FIG. 5 is a table showing different results based on trend 502, prediction 504, and the priority 506 given to a sphere based on the resulting trend 502 and prediction 504 findings. Generally, the priority computation may be based on a scoring system. The scoring system may combine many individual factors, and the combination of the individual factors may include a weighting of each of the factors based on their relative importance.

Priority Scanning and Protection

All of the devices 300 in the identified priority attack sphere will be scanned before others. It is likely that the users with attack spheres have additional devices 300 that may be targets of lateral attacks. Thus, all devices of these users will be scanned on priority. Additionally, scanning frequency will be increased for users in the attack sphere, and the scanning level will be increased (i.e., more ports to be scanned, more credentials to be checked).

In order to protect these devices 300, additional security policies will be applied, blocking traffic on the vulnerable ports and services. Devices 300 can also be quarantined in order to prevent lateral attacks from taking place on additional devices 300. The user of the devices 300 may additionally be advised and guided, for example, advised to take a device 300 offline, update software, etc.

The user and/or service provider can be informed of the scanning operations and outcomes in addition to the scanning prioritization. The user and/or service provider can also be informed of the benefits of the scanning prioritization, for example, how many scans were saved due to the knowledge of which devices 300 do not need to be scanned, or how much more frequently scans are taking place for high-risk devices 300.

Cloud Service Providers (CSPs) can leverage the priority-based scanning system to effectively control the magnitude of the damage caused by a vulnerability compromise. CSPs can trigger intelligent vulnerability scans, and the protection can be prioritized for the users who are most vulnerable.

By focusing the vulnerability scanning, detection, and protection on high-risk spheres, the present system can significantly reduce the attack exposure, and ensure the proactive damage control. CSPs can use this intelligent prioritization method and provide improved protection to their users.

Detection and Protection Process

Again, the present disclosure relates to systems and methods for building intelligence around IoT devices that can prioritize an attack attack sphere (attack sphere), such that scanning and protection can be focused on risky spheres before others that may be less at risk. The attack spheres include specific device types, vendors, geographic locations, demographics, or organizations. Priority based vulnerability scanning and protection is utilized along with the concept of attack spheres to define priority zones which may be unique. Priority computation based on trend analysis and predictive analysis is used to determine the vulnerability of specific devices and groups of devices. This will significantly reduce the attack exposure and ensures the proactive damage control.

Figure 6:
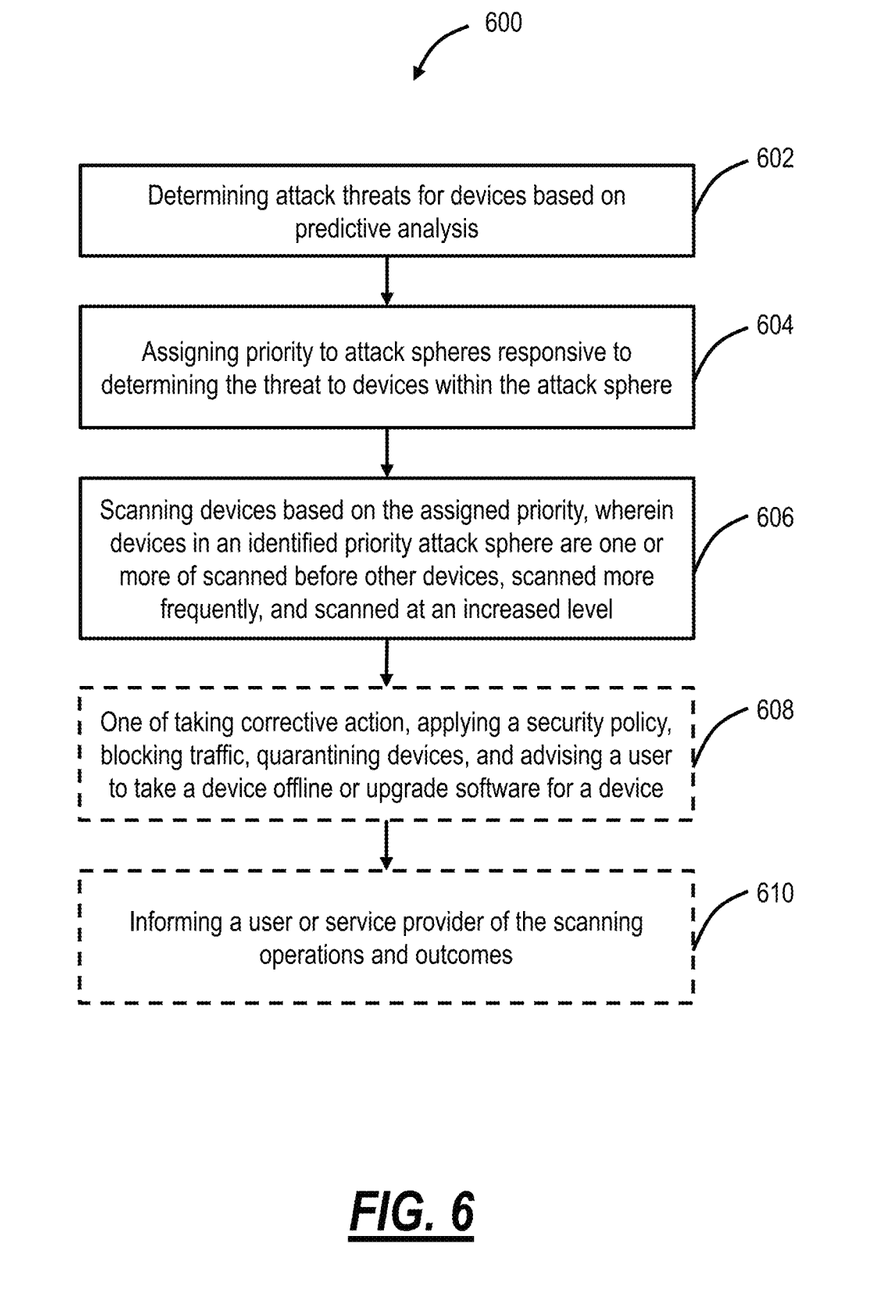
FIG. 6 is a flow chart of the Intelligent and proactive device vulnerability detection and protection process of the present disclosure.

FIG. 6 is a flow chart of the Intelligent and proactive device vulnerability detection and protection process 600 of the present disclosure. The present correlation-based algorithm for improving the vulnerability scanning to provide improved proactive protection to consumer IoT users includes the following steps. Determining 602 attack threats for devices based on predictive analysis, as well as optional trend analysis. Assigning 604 priority to devices responsive to determining the threat to the devices. Scanning 606 devices based on the assigned priority, wherein devices in an identified priority attack sphere are one or more of scanned before other devices, scanned more frequently, and scanned at an increased level. Applying 608 additional security policies to devices in an identified priority attack sphere. And Informing 610 a user or service provider of the scanning operations and outcomes.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer readable code stored thereon for programming a computer to perform steps of:

determining attack threats for devices based on predictive analysis;

assigning priority to attack spheres responsive to determining the attack threats to the devices within the attack sphere;

scanning the devices based on the assigned priority, the devices in an identified priority attack sphere are one or more of scanned before other devices, scanned more frequently, and scanned at an increased level.

2. The non-transitory computer-readable storage medium of claim 1, wherein the steps further include:
informing a user or service provider of scanning operations and outcomes.

3. The non-transitory computer-readable storage medium of claim 1, wherein the attack spheres are defined based on any of device types, device vendors, device models, software status, commonly used libraries, geographic location, demographic, organization, and time to identify risky spheres to focus protection.

4. The non-transitory computer-readable storage medium of claim 1, wherein the predictive analysis is based on historic data to forecast the attack spheres that are more likely potential attack targets than others.

5. The non-transitory computer-readable storage medium of claim 1, wherein the predictive analysis utilizes a prediction algorithm based on Machine Learning (ML).

6. The non-transitory computer-readable storage medium of claim 1, wherein the steps further include utilizing a combination of current trend and prediction analysis to detect any emerging trend early in time.

7. The non-transitory computer-readable storage medium of claim 1, wherein all devices concerning a user within the attack spheres are scanned with priority in order to protect the devices against lateral attacks.

8. The non-transitory computer-readable storage medium of claim 1, wherein the steps further include one of taking corrective action, applying a security policy, blocking traffic, quarantining the devices, and advising a user to take a device offline or upgrade software for a device.

9. The non-transitory computer-readable storage medium of claim 1, wherein the devices include Internet of Things (IoT) devices.

10. The non-transitory computer-readable storage medium of claim 1, wherein the attack spheres are defined based on a combination of trends, predictions, and priority.

11. A method comprising steps of:
determining attack threats for devices based on predictive analysis;
assigning priority to attack spheres responsive to determining the attack threats to the devices within the attack sphere;
scanning the devices based on the assigned priority, the devices in an identified priority attack sphere are one or more of scanned before other devices, scanned more frequently, and scanned at an increased level.

12. The method of claim 11, wherein the steps further include:
informing a user or service provider of scanning operations and outcomes.

13. The method of claim 11, wherein the attack spheres are defined based on any of device types, device vendors, device models, software status, commonly used libraries, geographic location, demographic, organization, and time to identify risky spheres to focus protection.

14. The method of claim 11, wherein the predictive analysis is based on historic data to forecast the attack spheres that are more likely potential attack targets than others.

15. The method of claim 11, wherein the predictive analysis utilizes a prediction algorithm based on Machine Learning (ML).

16. The method of claim 11, wherein the steps further include
utilizing a combination of current trend and prediction analysis to detect any emerging trend early in time.

17. The method of claim 11, wherein all devices concerning a user within the attack spheres are scanned with priority in order to protect the devices against lateral attacks.

18. The method of claim 11, wherein the steps further include one of taking corrective action, applying a security policy, blocking traffic, quarantining the devices, and advising a user to take a device offline or upgrade software for a device.

19. The method of claim 11, wherein the devices include Internet of Things (IoT) devices.

20. The method of claim 11, wherein the attack spheres are defined based on a combination of trends, predictions, and priority.

* * * * *